Oct. 24, 1939. N. C. SCHELLENGER 2,177,289
MEANS FOR PURIFYING CONTAMINATED AIR
Filed Dec. 13, 1937 2 Sheets-Sheet 1
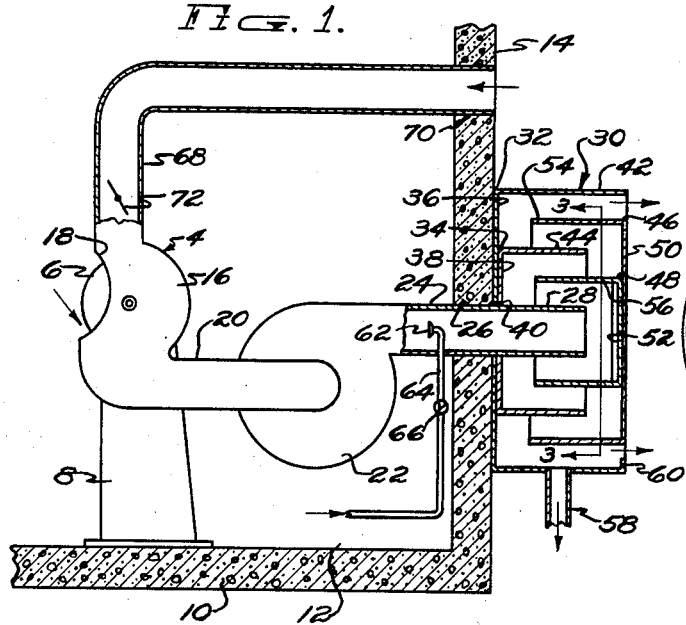
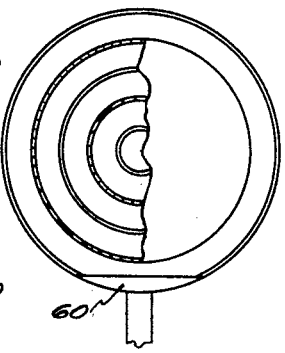
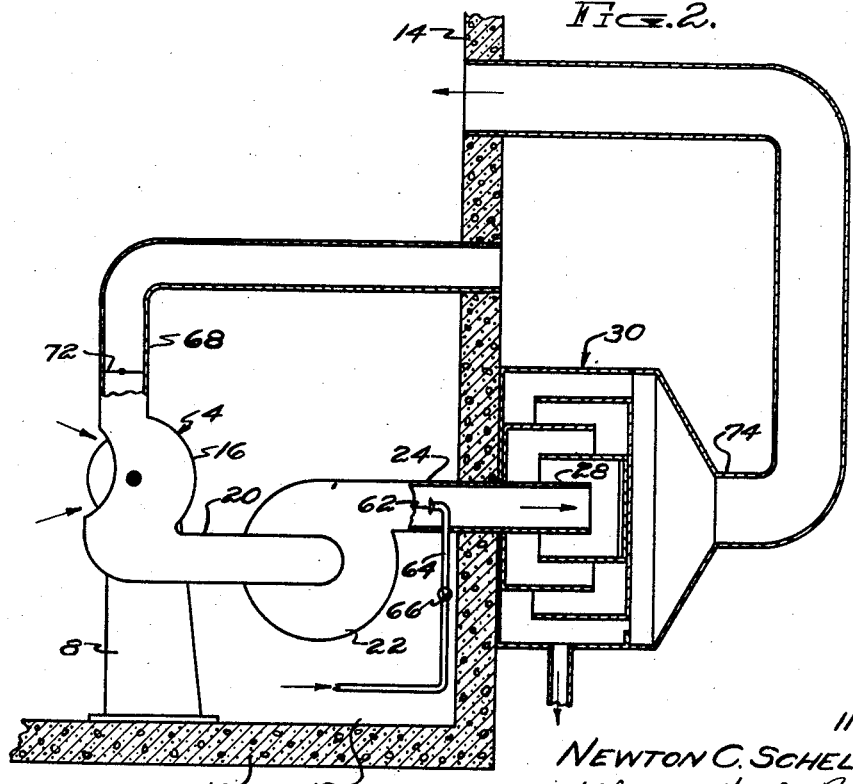
INVENTOR.
NEWTON C. SCHELLENGER.
BY Wilkinson, Huxley, Byron + Knight
ATT'YS.

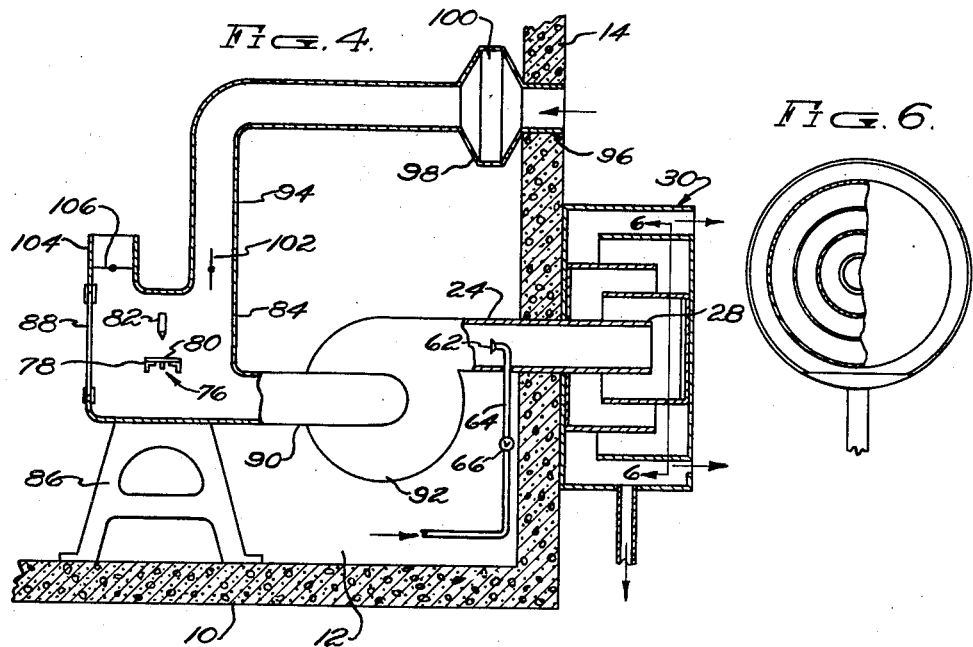
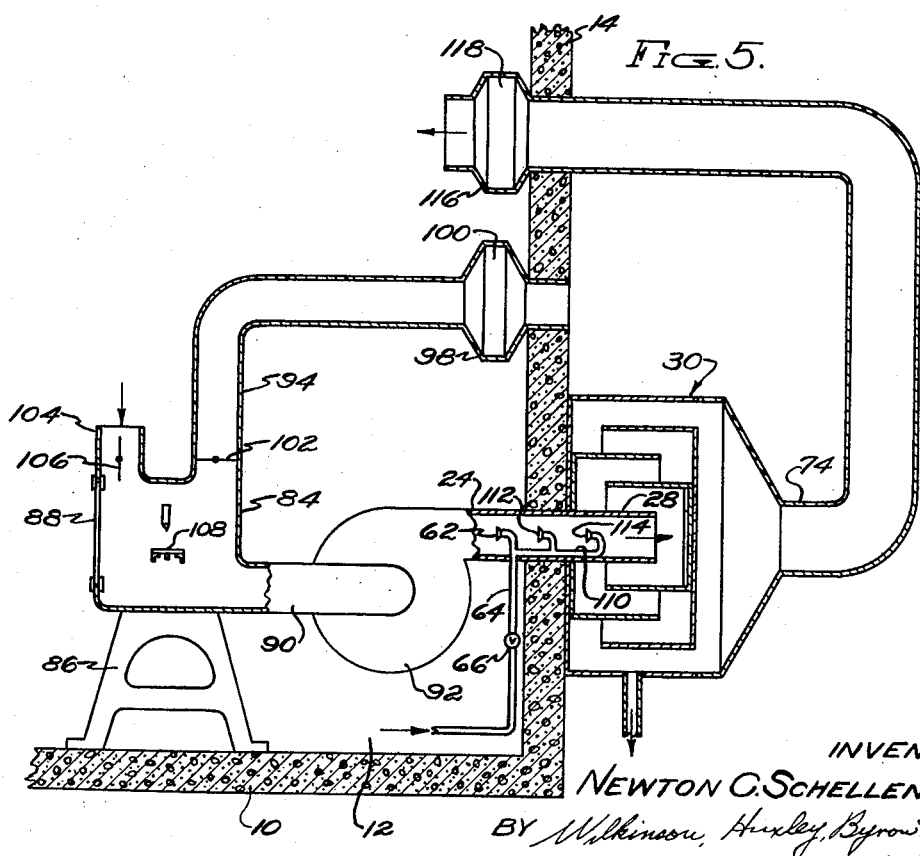

Patented Oct. 24, 1939

2,177,289

UNITED STATES PATENT OFFICE 2,177,289

MEANS FOR PURIFYING CONTAMINATED AIR

Newton C. Schellenger, Elkhart, Ind., assignor to Chicago Telephone Supply Company, Elkhart, Ind., a corporation of Indiana Application December 13, 1937, Serial No. 179,423

2 Claims. (Cl. 183—22)

The present invention relates to means for purifying and regulating the humidity of contaminated air.

Among the objects of the present invention is to provide a novel apparatus for regulating the humidity and of purifying contaminated air which, for example, may have a high relative humidity, include dust particles, pigments and other contaminating substances and which may have an objectionable odor.

It is also an object of the present invention to provide a novel apparatus which is easily constructed and maintained, efficient, reliable and relatively silent in its operation for the purpose of eliminating objectionable odors, dust pigments and the like from the air.

It is a further object of the present invention to provide a novel apparatus adapted to purify and discharge treated air and to also provide a novel means, when desired, for returning said treated air to the vicinity of the contaminating source. Still further, if desired, the device or apparatus may include means for supplementing the fresh air supplied at said source of contamination.

The present invention is particularly directed to a device which can be readily assembled to include means for localizing the contamination of the air and to purify said contaminated air by suitable washing, and to then separate the washed air from the fluid used in washing, and to either discharge the washed air exteriorly of the source of contamination or to return said washed air to the vicinity of the source of contamination. As hereinbefore set forth, such a novel apparatus may include means for supplementing the fresh air supply in the vicinity of the source of contamination.

More particularly, the invention comprehends the idea of projecting a spray into the stream of contaminated air in a direction opposite to the movement of said stream whereby the spray is substantially and completely atomized so as to become thoroughly and intimately dispersed and intermixed with the air, thus causing the dust particles and other solid material in the air stream to form into conglomerate masses and to be consolidated, after which the air and liquid are subjected to violent and rapid reversals of movement to separate the solid particles and other contaminated substances together with the fluid from the washed and cleansed air. The washed and cleansed air may then be discharged from the device either remote from the source of contamination or directed into the vicinity thereof whereby this washed air may be used over and over again, the solid particles and other contaminating substances, together with the fluid used in washing the air, being discharged from the device.

The invention also includes as an object the idea of constructing said apparatus in such a way that the air at the time of being washed moves at a relatively high velocity so as to cause a thorough and complete dispersion of the washing fluid throughout the body of air, and to include in the separator structure an arrangement of baffles or reversal means so that initially the body of air entering said separator has substantially the same velocity as during the passage of the same through the washing mechanism, but which velocity is gradually decreased so that at the point of discharge the velocity of the air is relatively low, thus effecting a more uniform and complete separation of the contaminating substances and the washed air and to eliminate objectionable noises.

Another object of the present invention is to provide a novel apparatus for washing and purifying air which includes elements for drawing air from the vicinity of the contaminating source to thoroughly wash the air, effecting an agglomeration of the solid particles carried by said air and to dissolve the other contaminations, subjecting the air to rapid and violent reversals of movement, thus separating the contaminations from the air whereby the washed air may be discharged either away from the device or returned into the vicinity of the contaminating source, the method also including, when desired, the additional step of supplementing the air supply in the vicinity of the source of contamination.

Other objects, features, capabilities and advantages are comprehended by the invention, as will later appear and as are inherently possessed thereby.

Referring to the drawings:

Figure 1 is a view partly in elevation and partly in cross-section of a device embodying the present invention;

Figure 2 is a view similar to Figure 1 of the drawings, disclosing a modified form of construction for the air purifying apparatus;

Figure 3 is a view partly in elevation and partly in cross-section taken in the plane represented by line 3—3 of Figure 1 of the drawings;

Figure 4 is a view corresponding to Figure 1 of the drawings disclosing a modified construction for the air purifying apparatus;

Figure 5 is a view similar to Figure 2 of the drawings showing still another modified construction for the air purifying apparatus; and Figure 6 is a view corresponding to Figure 3 of the drawings and taken in the plane represented by lines 6—6 of Figure 4 of the drawings.

Referring now more in detail to the drawings and particularly to Figure 1 thereof, an embodiment selected to illustrate the present invention is shown in association with a grinding machine 4 which includes the rotatable wheel or the like 6 mounted upon a pedestal 8 supported upon the floor 10 of a room 12, this room being further provided with a wall 14. The grinding machine 4 is formed with a housing 16 which is cut away as at 18, whereby the same may be used by an operator, this cut away portion 18 forming an opening which also admits air into the housing 16. Communicating with the housing 16 is a conduit 20 which forms the intake of a blower or fan 22, this blower or fan being further provided with a discharge or outlet conduit 24 adapted to extend through an opening 26 provided in the wall or partition 14. In association with the end 28 of the outlet conduit 24 is a separator 30 which comprises a plurality of drums 32 and 34 having the end walls 36 and 38 adjacently disposed and associated with the wall 14 and having openings 40 surrounding the end 28 of the outlet conduit 24, these assemblies being further provided with the circularly arranged walls 42 and 44, respectively, which are concentrically disposed in relation to the end 28 of outlet 24 and are in spaced relation to one another, the wall 44 being also spaced in relation to the conduit end 28. The separator further includes the drums 46 and 48 having rear or end walls 50 and 52, respectively, in association with one another and connected together in spaced relation to the end walls 36 and 38, these drums being further provided with the circular walls 54 and 56, respectively, which are concentrically arranged with one another in spaced relation to the end conduit 28, the wall 54 projecting into the annular space between walls 42 and 44 and the wall 56 projecting into the annular space between the conduit end 28 and the wall 44. Such structure provides a tortuous path for movement of air discharged through the outlet conduit 24, thus causing rapid and violent reversal of movement of the same through this separator mechanism, the air being discharged therefrom through the annular space between walls 54 and 42 exteriorly or beyond the wall 14. The wall 42 of the drum 32 is provided with a conduit 58 depending or extending from the lower part thereof for discharge of the fluid used in the apparatus for washing the air, to a drain, this wall 42 being further provided with a baffle or flange 60 as clearly shown in Figure 3 of the drawings, which prevents discharge of the washing fluid from the face of the separator.

The contaminated air which is drawn from the housing 16 by the blower 22 and discharged through the conduit 24 is washed during its passage through said conduit 24 by means of a nozzle 62 at the end of a pipe or conduit 64 through which suitable washing fluid may be discharged, as for example, water which is under pressure, the flow of water in said conduit being controlled by the valve 66.

Communicating with the upper end of the housing 16 and adjacent the wheel 6 is a conduit 68 extending from the housing through an opening 70 in the wall 14 whereby air may be drawn therethrough under the action of the blower or fan 22 to supplement the air supply in the housing 16 adjacent the point where the same is contaminated by the dust particles from the wheel 6. The flow of air through this conduit 68 may be controlled by a suitable damper or valve 72 so that a sufficient supply of air may be introduced into the housing 16.

The operation of the device disclosed in Figure 1 of the drawings, can be initiated by opening the valve 66 to obtain the desired volume of wash water after which the blower 22 is operated to draw the contaminated air from housing 16 and to discharge the same through the outlet conduit 24.

It should be noted that nozzle 62 directs the spray of water in a direction opposed to the flow of air through the conduit 24 so that the water is finely divided and substantially atomized, thus being completely intermixed with the air throughout the body of the same so as to thoroughly wet all the dust particles or other contaminating substances being carried by the body of air, the treated air being discharged from the outlet conduit 24 into the separator 30. A relatively high velocity of the air stream is maintained in the outlet conduit 24, and because of this high velocity the treated air including the washing and contaminating substances are violently directed against the end wall 52 of the drum 48. This body of air is then directed through the tortuous passageways provided by the drums of the separator whereby the same is subjected to rapid and violent reversals of movement until the same is discharged through the annular opening between the walls 42 and 54. Inasmuch as the walls of the drums are concentrically arranged in relation to the conduit end 28 and are in equally spaced relation to provide a tortuous passageway for the discharged air, it will be seen that the velocity of the treated air gradually decreases in its passage through the separator from an amount substantially equal to that of the body of air in the outlet conduit 24 to a relatively low amount at the point of discharge from said separator. This provides a device which is silent in its operation, and the air discharged from the separator emerges as a gentle breeze, yet the velocity at the beginning of the movement of the air through the separator and the velocity during the passage thereof through said separator is sufficient, together with the rapid reversals of movement, to completely separate and discharge the solid particles in the washing medium from the air, these substances being discharged through the conduit 58.

As before stated, the air supplied to the housing 16 may be suitably adjusted by the valve or damper 72, and the amount of water being discharged into the outlet conduit 24 may likewise be suitably adjusted by means of the valve 66 whereby the device can be operated efficiently not only for removing the objectionable odors from the body of air being treated, but also for completely eliminating and precipitating dust particles and other contaminating substances.

In Figure 2 of the drawings is disclosed an air purifying apparatus conforming substantially to the apparatus shown in Figure 1 of the drawings, and being associated with the machine or device 4 which is mounted on the pedestal 8 supported on the floor 10 within the room 12 which is formed with a wall 14, the device 4 having associated therewith the air intake conduit 68 which extends through the wall 14. Furthermore, the air purifying apparatus includes the blower or fan 22 having the intake conduit 20 communicating with the housing 16 of the mechanism 4, and the discharge conduit 24 which extends through the wall 14. Said apparatus also includes the fluid supply conduit 64 having control valve 66 and which extends through conduit 24 and has nozzle 62 at the end thereof disposed within said conduit.

Associated with the outer end 28 of the conduit 24 is a separator 30 corresponding essentially to separator 30 hereinbefore described, the same in this embodiment, however, being in communication with a conduit 74, which latter conduit receives the washed air discharged from the separator 30 and returns the same through the wall 14 and into the room 12 in the vicinity of the device 4, although it is to be understood that the discharge of this washed air may be effected at any point desired.

The operation of the device as shown in Figure 2 of the drawings is essentially the same as the operation of the device of Figure 1 of the drawings, but with the exception that in view of the fact that the washed air is being returned to room 12, the intake of air through the conduit 68 is greatly decreased, and accordingly valve or damper 72 may be partially or completely closed to balance the air supply into housing 16. This valve or damper may be adjusted as desired, and in other respects the device operates in the same manner as the device of Figure 1 of the drawings to effect a thorough washing of the air from the contaminating source, namely, the machine 4.

Figure 4 is further illustrative of the invention, this figure of the drawings disclosing an air purifying apparatus associated with a device 76 which, in this illustration, comprises a conveyor 78 adapted to carry a plurality of articles 80, to which is applied a layer of material through the spray nozzle 82. Because of the particular process employed in applying a layer of material to the articles 80, it has been found desirable to enclose the device by means of a housing 84 in order that the dust and vapors may be confined to a relatively small space and suitably handled, and to prevent the disagreeable odors accompanying this process from permeating the atmosphere of the room 12. The device and housing 84 are mounted upon pedestals 86 disposed upon the floor 10, the room 12 in which the device is located being further provided with the wall or partition 14. The housing 84 is provided with a window 88 through which may be observed the operation of the device, and to make any adjustments which may be necessary to control the process which is carried on. This housing 84 communicates by way of a conduit 90 with a blower or fan 92 which corresponds with fan or blower 22 and which has the discharge outlet 24 extending through the wall 14. Disposed within the conduit 24 is the nozzle 62 mounted on the end of the pipe or conduit 64, and the operation of the nozzle 62 is controlled by valve 66 as hereinbefore related. The outer end 28 of conduit 24 exteriorly of wall 14 is associated with the separator 30 corresponding in every way with the separator as shown in Figure 1.

The housing 84 is in communication with the conduit 94 which extends upwardly and outwardly through an opening 96 in the wall 14 whereby air may be drawn into housing 84 by means of the fan or blower 92. In this illustrative embodiment, the conduit 94 is provided with an enlarged part 98 adjacent wall 14 in which fine oiled glass wool, or any other suitable filter material 100, may be disposed in order to eliminate any dust or other particles in the body of air being drawn into housing 84 through the conduit 94. As in the previously described embodiments, the intake conduit 94 may be provided with a valve or damper 102 for controlling the supply of air into housing 84. Housing 84 is further shown with a conduit 104 provided with valve or damper 106, which conduit 104 opens into the room 12 and from which air may be drawn into housing 84.

The operation of the device disclosed in Figure 4 of the drawings is substantially identical to the operation of the apparatuses shown in Figures 1 and 2, with the exception that in this embodiment the valves 102 and 106 are suitably regulated in conjunction with the other necessary regulations of the device to admit a suitable amount of air into housing 84, and which air passes through the housing 84 and into the air purifying apparatus.

In Figure 5 of the drawings is disclosed still another modification of an air purifying apparatus made in accordance with the present invention, the same being constructed along the line of the apparatus shown in Figure 4. In this figure of the drawings, the air purifying mechanism is shown in association with the device 108 corresponding to the device 76 of Figure 4 and which device is enclosed by housing 84. The housing and the device are supported upon pedestals 86 on the floor 10, the room 12 in which the device is located being provided with the wall 14. The air purifying mechanism includes the blower or fan 92 formed with an intake conduit 90 in communication with housing 84, and a discharge conduit 24 which extends through the wall 14. In this embodiment the conduit 64 for discharging the washing fluid into the conduit 24 and which is controlled by valve 66 extends through a suitable opening in the conduit 24 and is provided with nozzle 62 at one end and a branch conduit 110 communicating therewith and on which is mounted the additional nozzles 112 and 114 whereby three nozzles are provided for projecting the washed fluid into conduit 24.

Associated with the outer end 28 of conduit 24 is a separator 30 which corresponds to separators 30 hereinbefore described, this separator being additionally supplied with a conduit 74 as shown in Figure 2 of the drawings, which is provided to direct the discharged air from the separator upwardly and through the wall 14 and back into the room 12 in the vicinity of the device 108. As shown in this embodiment, the conduit 74 adjacent the inner end on the inside of wall 14 is enlarged as at 116 and is adapted to receive a body of fine oiled glass wool, or any other filter material 118, whereby any particles which may not have been separated in the separator 30 and are still being carried by the body of air, are filtered out at this point prior to the passage of the body of air into room 12. It will be clearly appreciated that in view of the washing and separating of the contaminating material from the air in the separator 30, this filter merely filters out some of the extremely fine particles of material which may not have been separated in the separator 30, and because of this fact this filter has a very long life and accordingly replacement thereof is infrequent.

As in the embodiment shown in Figure 4 of the drawings, the housing 84 is provided with the intake conduit 94 having the enlarged part 98 in which some suitable filtering material 100 is disposed for filtering the air being drawn into housing 84 from exteriorly of the wall 14, the passage of air in said conduit being controlled by the valve or damper 102. Furthermore, the housing 84 is formed with a window 88 for inspecting the device 108 and the articles being operated on thereby, and also the conduit 104 adjacent thereto which opens into room 12 and which is provided with valve or damper 106 for controlling the passage of air from room 12 into housing 84.

The operation of the device shown in Figure 5 of the drawings is substantially the same as the operation of the devices hereinbefore described, and particularly the device shown in Figure 4, except that a different adjustment is necessary for the valve 66 in view of the three nozzles which are used in the outlet conduit 24. Furthermore, inasmuch as the washed air from the separator 30 is being returned to room 12, the valve or damper 106 will be adjusted so that a large part of the air entering the housing 84 will be supplied through conduit 104, thus making it unnecessary to have the valve 102 in its full opened position, the same being opened only as desired to replenish the supply of air into housing 84.

When it is desired to provide a machine which is extremely quiet in its operation, one or more of the innermost walls, such as 52, 56, 38, 44, etc., forming the separator 30 of any one of the embodiments hereinbefore described may be covered or lined with lead or some other very heavy non-corrosive metal which acts as a sound deadener for the body of treated air passing through the end 28 of outlet conduit 24. Preferably it is only necessary to line the bottoms of the two inner walls with such material.

In addition to serving to wash and purify the air and to remove contaminating particles therefrom, my apparatus may also be utilized to regulate the humidity of the air. It may be used to raise the humidity in the room to a high point when necessary or desirable in certain operations. As the air passes through the spray, the temperature of the air will be controlled to a very large extent by the temperature of the spray and due to the water being quite evenly dispersed through the air, the air will almost instantly become saturated (100% relative humidity). Normally the temperature of the air at this point would be less than room temperature so that when the air is discharged into the room it will rise in temperature and the relative humidity will decrease. However, it may be desirable in the case of some special process work to have 100% relative humidity in which case the temperature of the washing water can be increased so that the issuing air is at or above room temperature, so that the relative humidity of the room will be maintained at a high level.

While I have herein described and upon the drawings shown ilustrative embodiments of the invention, it is to be understood that the invention is not limited thereto but may comprehend other constructions, arrangements of parts, details and features without departing from the spirit of the invention.

I claim:
1. In combination: a duct; blower means connected with the inlet end of the duct for projecting contaminated gas therethrough at high velocity; means located at a medial point of the duct for introducing a spray of cleaning liquid into said duct to be carried along with the gas at high velocity; a separator positioned to receive the gas discharged from the duct, said separator comprising three or more spaced apart walls lying in surfaces which encircle each other and the mouth of the duct so as to coact with the duct and each other to form passageways of increasingly larger cross-sectional area; a wall closing one end of each of said passageways, said end walls being arranged alternately at opposite ends of the separator so that each passageway discharges into the next larger passageway and whereby the direction of gas flow in the spearator is abruptly reversed; the closed end of the smallest passageway being of increased strength and so positioned as to be impinged by the gaseous mixture discharged from the duct at high velocity; each succeednig reversal of gas flow in the separator being accompanied by a corresponding decrease in velocity whereby the moisture and saturated impurities are separated from the gas; the outermost of said passageways providing for the discharge of cleansed gas from the separator; and an outlet leading from said outermost passageway for the cleaning liquid and impurities washed from the gas.

2. In combination: a duct; blower means connected with the inlet end of the duct for projecting contaminated gas therethrough at high velocity; means for introducing a spray of cleaning liquid into said duct in a direction toward the blower means and against the flow of air to effect a degree of atomization as a result of the impact of the air with the spray; a separator positioned to receive the gas discharged from the duct, said separator comprising a plurality of spaced apart walls lying in surfaces which encircle each other and the mouth of the duct so as to coact with the duct and each other to form passageways of increasingly larger cross-sectional area; a wall closing one end of each of said passageways, said end walls being arranged alternately at opposite ends of the separator so that each passageway discharges into the next larger passageway and whereby the direction of gas flow in the separator is abruptly reversed; the closed end of the smallest passageway being of increased strength and so positioned as to be impinged by the gaseous mixture discharged from the duct at high velocity; each succeeding reversal of gas flow in the separator being accompanied by a corresponding decrease in velocity whereby the moisture and saturated impurities are separated from the gas; the outermost of said passageways providing for the discharge of cleansed gas from the separator; and an outlet leading from said outermost passageway for the cleaning liquid and impurities washed from the gas.

NEWTON C. SCHELLENGER.